Oct. 21, 1958           J. R. WILLIAMS         2,857,321
METHODS OF SOLDERING TO ALUMINUM OR OTHER
MATERIAL HAVING SURFACE-OXIDE FILM
Filed March 15, 1957
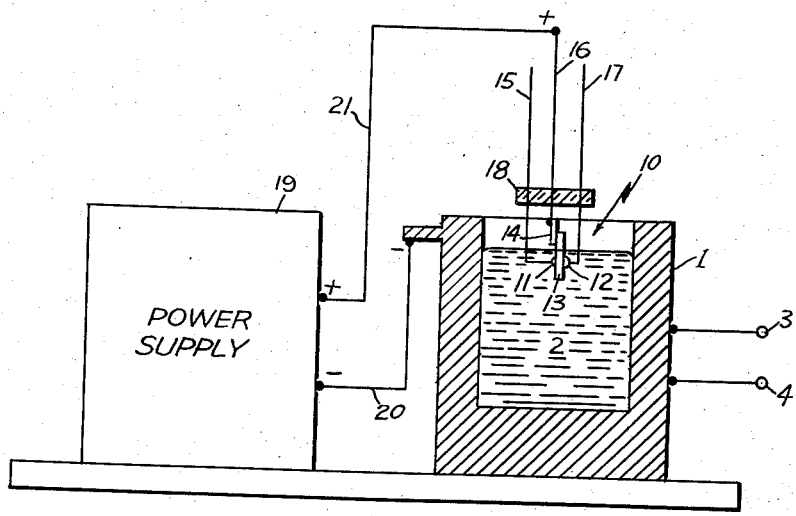
INVENTOR
JOHN R. WILLIAMS
BY
ATTORNEY ived Oct. 21, 1958

2,857,321

METHODS OF SOLDERING TO ALUMINUM OR OTHER MATERIAL HAVING SURFACE-OXIDE FILM

John R. Williams, Natick, Mass., assignor to Raytheon Manufacturing Company, Waltham, Mass., a corporation of Delaware Application March 15, 1957, Serial No. 646,473

9 Claims. (Cl. 204—143)

This invention relates generally to a novel method of effecting a solder connection to a body of aluminum, and more particularly to such a method as applied in the manufacture of semiconductive translating devices.

It has long been known that mechanically strong soldered joints to aluminum are difficult to attain, due chiefly, it is believed, to an oxide film which rapidly forms on the surface of the aluminum when it is exposed to an oxide-forming atmosphere. This problem has been prevalent in the construction of semiconductive devices wherein aluminum is used as the impurity element which determines the electrical characteristics of the semiconductive body. As is now well known, the impurity materials which are included in the body of semiconducting material are chosen from the third and fifth groups of the Periodic Table according to Mendelyeev, those from the third group being designated as P-type impurities, while those from the fifth group are designated as N-type impurities. When an area of the semiconductor body is provided with a predominance of P-type impurity atoms, the area is said to be a P-type region or zone, and electrical conduction through the region will be primarily by "holes." Conversely, when an area of the semiconductor body is provided with a predominance of N-type impurity atoms, the area is said to be an N-type region or zone, and electrical conduction through the region is principally by electrons. The interface between a P-type region and an N-type region acts as a rectifying barrier and is known as a P–N (N–P) junction.

In the prior art, when aluminum was used as the impurity material, an electrical connection to the aluminum required the use of special aluminum fluxes and the use of special solders in order to make the connection. However, even with the use of the special materials, no completely satisfactory method of making this aluminum connection has yet been devised which consistently produces reliable solder joints. Since aluminum is one of the best impurity materials thus far found for wetting and fusing into the semiconductive material, especially silicon, it is highly desirable that a reliable method of soldering to the aluminum be devised.

Accordingly, the present invention is directed toward a novel method of making a solder connection to a body of aluminum, which method has been found particularly feasible to use in the construction of semiconductive devices which utilize aluminum as an impurity material. In accordance with the present invention, the aluminum is dipped into a solution of a solder which is connected to a source of electrical energy so that the solder acts as an electrolyte which, when energized, removes the oxide film from the surface of the aluminum and at the same time allows the solder to wet the surface of the aluminum.

The invention will be better understood as the following description proceeds taken in conjunction with the accompanying drawing wherein the single figure is a schematic representation of one method of carrying out the soldering process according to the invention.

Referring now to the single figure of the drawing, there is shown a pot or container 1, in which there is a quantity of a suitable aluminum-wetting solder 2, as, for example, a tin-nickel-zinc alloy. It should be noted that pure tin solder may also be used, but pure tin is rather brittle and not as desirable as its alloys. A pair of terminals 3 and 4 are connected to the solder pot 1, and lead to a suitable source of heat in order to melt, and retain in a melted state, the solder 2 contained in the pot 1. A transistor, indicated generally by the reference numeral 10, may be prepared by any suitable method well known in the art as, for example, by fusing a plurality of aluminum dots 11 and 12 into opposite sides of a silicon chip 13, and attaching a suitable base tab 14 to the surface of the semiconductive chip 13. The dots 11 and 12 thus constitute the emitter and collector, respectively, while the tab 14 constitutes the base connection of the device. The semiconductive chip 13 may then be mounted on a suitable insulating head 18, having conducting leads 15, 16 and 17 insulatedly supported therein, with a solder connection being made between the base tab 14 and the base lead 16. The transistor assembly is then inserted into the liquid solder 2 with the aluminum dots 11 and 12 submerged below the surface of the solder 2. Electrical connections are provided between a suitable source of electrical energy 19 and the solder pot 1 via a conducting lead 20, and a second connection made between the electrical source 19 and the base lead 16 via the conductor 21. The source 19 may be either a source of direct current, or a source of alternating current, with the useful oxide removing action occurring when the alternating current is of the same polarity as the direct current illustrated in the drawing.

With the transistor assembly immersed in the solder pot 1, as shown, the power from the source 19 may be turned on and the etching process allowed to continue for 15 to 20 seconds. When an alternating current is used, it is preferable that the source 19 supply a current of approximately 300–400 milliamps, whereas with a direct current source a current of approximately 40 milliamps for the time recited above is sufficient to accomplish the desired result. However, other current values, with appropriate time intervals, will produce the desired result.

It has been found that the procedure outlined above results in an extremely reliable and mechanically strong solder joint being formed between the lead 15 and the aluminum 11, and between the lead 17 and the aluminum dot 12. It is believed that the action taking place is that of electrolytic reduction of the aluminum oxide film on the surface of the dots 11 and 12. Once the aluminum oxide film is removed, the pure aluminum is easily wet by the surrounding solder which acts as an electrolyte. Since the dots are immersed in the solder, there is no opportunity for corrosive attack on the exposed pure aluminum before wetting by the solder occurs.

Although the present inventive concept has been illustrated with reference to its use in the semiconductive device art, it should be understood that it may be employed wherever it is desired to make a superior solder connection to aluminum or to any material subject to rapid, tenacious, surface-oxide formation similar to that occurring to aluminum. For example, the process was successfully extended to the soldering of small aluminum parts, wherein two ribbons of aluminum .005" thick, .108" wide and 2" long were tinned with solder by the above-described method. After tinning, the pieces were fluxed with a conventional fluxing material, and soldered together with a soldering iron. The resulting joint was extremely strong mechanically. It should also be understood that although the solder 2 acted as the electrolyte in the embodiment set forth, it is possible to utilize a common electrolyte, such as strongly basic potassium hydroxide, which is heated above the melting point of the particular solder used to pre-tin the material to be soldered, such as the leads 15 and 17 shown in the drawing, for example. The transistor unit may then be inserted into the potassium hydroxide in the same manner previously recited in order to remove the oxide film on dots 11 and 12, and allow the solder on the leads 15 and 17 to flow onto the dots.

Although there have been described what are considered to be preferred embodiments of the present invention, various adaptations and modifications thereof may be made without departing from the spirit and scope of the invention as defined in the appended claims.

What is claimed is:

1. The method of making a solder connection to a material having a tenacious surface-oxide film, said method comprising immersing said material in a heated liquid electrolyte in the presence of a solder, placing a body to be connected to said material adjacent said material, passing current through said electrolyte, and causing molten solder to come into contact with said body and said material.

2. The method of making a solder connection to a material having a tenacious surface-oxide film, said method comprising immersing said material in a heated liquid electrolyte, immersing a body to be connected to said material in said electrolyte adjacent said material, passing current through said electrolyte, and causing a quantity of molten solder to come into contact with said body and said material.

3. The method of making a solder connection to a body of aluminum having a tenacious surface-oxide film, said method comprising immersing said material in a heated liquid electrolyte in the presence of a solder, placing a body to be connected to said aluminum adjacent said aluminum, and causing molten solder to come into contact with said body passing current through said electrolyte and said aluminum.

4. The method of making a solder connection to a piece of aluminum, said method comprising immersing said aluminum in a heated liquid electrolyte, immersing a body to be connected to said aluminum in said electrolyte adjacent said aluminum, and causing a quantity of molten solder to come into contact with said aluminum, passing current through said electrolyte and said body.

5. The method of making a solder connection to a material having a tenacious surface-oxide film, said method comprising placing said material in a quantity of molten solder, placing a body to be connected to said material in said solder adjacent said material, and passing current through said solder to remove said oxide film and cause said molten solder to come into contact with said body and said material.

6. The method of making a solder connection to a material having a tenacious surface-oxide film, said method comprising immersing said material in a heated liquid electrolyte, providing a body to be connected to said material with a quantity of solder which will become molten when immersed in said electrolyte, placing said body in said electrolyte adjacent said material, and passing current through said electrolyte to remove said oxide film and allow said molten solder to come into contact with said body and said material.

7. The method of making a solder connection to aluminum having a tenacious surface-oxide film, said method comprising placing said aluminum in a quantity of molten solder, placing a body to be connected to said aluminum in said solder adjacent said aluminum, and passing current through said solder to remove said oxide film to allow said molten solder to come into contact with said body and said aluminum.

8. The method of making a solder connection to aluminum having a tenacious surface-oxide film, said method comprising immersing said aluminum in a heated liquid electrolyte, providing a body to be connected to said aluminum with a quantity of solder, placing said body in said electrolyte adjacent said aluminum, and passing current through said electrolyte to allow said molten solder to come into contact with said body and said aluminum.

9. The method of making a solder connection to an aluminum dot attached to a semiconductive chip, said method comprising immersing said chip and said dot in a heated liquid electrolyte in the presence of a solder, placing a body to be connected to said dot adjacent said dot, passing current through said electrolyte to allow molten solder to come into contact with said body and said aluminum dot.

References Cited in the file of this patent

FOREIGN PATENTS 241,058  Great Britain _____ Oct. 15, 1925

UNITED STATES PATENT OFFICE
CERTIFICATE OF CORRECTION

Patent No. 2,857,321                                  October 21, 1958

John R. Williams

It is hereby certified that error appears in the printed specification of the above numbered patent requiring correction and that the said Letters Patent should read as corrected below.

Column 3, lines 40 and 41, strike out "passing current through said electrolyte" and insert the same before "and", in line 39, same column; same column 3, line 48, strike out "passing current through said electrolyte" and insert the same before "and", in line 46, same column.

Signed and sealed this 6th day of January 1959.

(SEAL)

Attest:

KARL H. AXLINE
Attesting Officer

ROBERT C. WATSON
Commissioner of Patents